(12) United States Patent
Hashimoto

(10) Patent No.: US 8,330,907 B2
(45) Date of Patent: Dec. 11, 2012

(54) LIQUID CRYSTAL DISPLAY ELEMENT, AND LIQUID CRYSTAL DISPLAY DEVICE

(75) Inventor: Shunichi Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 556 days.

(21) Appl. No.: 10/990,859

(22) Filed: Nov. 17, 2004

(65) Prior Publication Data

US 2005/0162591 A1    Jul. 28, 2005

(30) Foreign Application Priority Data

Nov. 21, 2003   (JP) ................................ 2003-392364

(51) Int. Cl.
*G02F 1/1335* (2006.01)
(52) U.S. Cl. ....................... 349/113; 349/123
(58) Field of Classification Search .................. 349/113, 349/114
See application file for complete search history.

(56) References Cited

U.S. PATENT DOCUMENTS

| | | | |
|---|---|---|---|
| 5,858,276 A * | 1/1999 | Iwasaki et al. ........... | 252/299.63 |
| 6,124,912 A | 9/2000 | Moore | |
| 6,285,423 B1 * | 9/2001 | Li et al. ............ | 349/96 |
| 6,342,971 B1 * | 1/2002 | Hashizume et al. .......... | 359/634 |
| 6,690,446 B1 * | 2/2004 | Okamoto et al. ............ | 349/181 |
| 6,750,931 B2 * | 6/2004 | Satake et al. ................... | 349/113 |
| 2002/0024621 A1 * | 2/2002 | Hirakata et al. ................ | 349/34 |
| 2002/0086120 A1 * | 7/2002 | Jacob et al. ................... | 428/1.1 |
| 2002/0186336 A1 | 12/2002 | Andry et al. | |
| 2003/0020854 A1 | 1/2003 | Satake et al. | |
| 2003/0180464 A1 | 9/2003 | Ohkouchi et al. | |
| 2004/0105061 A1 * | 6/2004 | Andry et al. ................... | 349/123 |

FOREIGN PATENT DOCUMENTS

| | | |
|---|---|---|
| JP | 11-002707 | 1/1999 |
| JP | 11-344726 | 12/1999 |
| JP | 2001-056449 | 2/2001 |
| JP | 2002-214616 | 7/2002 |
| WO | WO 01/77747 | 10/2001 |

* cited by examiner

*Primary Examiner* — Richard Kim
(74) *Attorney, Agent, or Firm* — SNR Denton US LLP

(57) ABSTRACT

There is provided a liquid crystal display element (1) including a transparent substrate (2) having formed on a surface of a glass substrate (2*a*) thereof a transparent electrode (6) and an alignment layer (18) covering the transparent electrode (6), a drive circuit board (3) disposed opposite to the transparent substrate (2) and having formed on a surface of a silicon substrate (3*a*) thereon opposite to the transparent electrode (6) a plurality of switching drive circuits (9) and a plurality of reflection pixel electrodes (15), corresponding to pixels (12*a*), respectively, a protective layer (16) covering the plurality of reflection pixel electrodes (15) and an alignment layer (19) covering the protective layer (16) and a liquid crystal layer (4) interposed between the alignment layer (18) on the transparent substrate (2) and the alignment layer (19) on the drive circuit board (3), the protective layer (16) being a stack of at least two dielectric layers (16*a*, 16*b*) different in refractive index from each other, and the thickness of each of the stacked dielectric layers (16*a*, 16*b*) being set to compensate the wavelength dependence of the reflectance of the reflection pixel electrodes (15). Thus, the reflection type liquid crystal display element (1) has an improved performance of spectral reflection.

18 Claims, 9 Drawing Sheets

LIQUID CRYSTAL DISPLAY ELEMENT, AND LIQUID CRYSTAL DISPLAY DEVICE

BACKGROUND OF THE INVENTION

1. Field of the Invention

The present invention relates to a liquid crystal display element that modulates and emits incident light and a liquid crystal display device which displays an image with the use of light modulated by such a liquid crystal display element.

This application claims the priority of the Japanese Patent Application No. 2003-392364 filed on Oct. 21, 2003, the entirety of which is incorporated by reference herein.

2. Description of the Related Art

There are available various types of display devices such as projection displays (projector), various types of portable electronic devices and various of information processing terminals. Each of such devices uses a liquid crystal display element called "liquid crystal panel", "liquid crystal cell" or the like. The liquid crystal display elements generally include transmission type ones and reflection type ones. The transmission type liquid crystal display element modulates light from a back light provided at the rear side thereof and emits it as transmitted light. On the other hand, the reflection type liquid crystal display element modules incident light and emits it as reflected light. Recently, for a higher definition image display, more compact design and higher light intensity of the projectors, the reflection type liquid crystal display element has been attracting attention as a display device which could implement the higher image definition, more compact design and higher efficiency for light utilization, and is actually commercialized (cf. Japanese Patent Application Laid Open No. 2003-57674).

A conventional reflection type liquid crystal display element will be illustrated and explained here by way of example with reference to FIG. 1. The reflection type liquid crystal display element is generally indicated with a reference numeral 200. As shown, it includes a glass substrate 202 and drive circuit board, provided opposite to each other. The glass substrate 202 has provided thereon a transparent electrode 201 formed from an electrically conductive material such as ITO (indium-tin oxide), and the drive circuit board 204 has provided thereon reflection pixel electrodes 203 formed from an aluminum-based metallic material. A liquid crystal layer 206 is formed by charging a liquid crystal between the glass substrate 202 and drive circuit board 204, sealed at their ends with a sealing member 205. Also, each of the surfaces of the glass substrate 202 and drive circuit board 204, opposite to each other, has provided thereon an alignment layer 207 to align the liquid crystal molecules 206a in a predetermined direction. The drive circuit board 204 is a semiconductor switching drive circuit of the C-MOS (complementary-metal oxide semiconductor) type formed on a silicon substrate. The reflection pixel electrodes 203 formed on the drive circuit board 204 reflect incident light from the glass substrate 202 and applies a voltage to the liquid crystal layer 206.

In the reflection type liquid crystal display element 200, a voltage is applied between the transparent electrode 201 of the glass substrate 202 and reflection pixel electrodes 203 of the drive circuit substrate 204, opposite to each other, thereby applying a voltage to the liquid crystal layer 206. Then, the liquid crystal layer 206 is varied in optical characteristic correspondingly to a potential difference between the electrodes to modulate light passing by the liquid crystal layer 206. Thus, the reflection type liquid crystal display element 200 can assign intensity levels by the light modulation.

The liquid crystals used as such a liquid crystal display element include a horizontally-aligned liquid crystal such as a twisted nematic liquid crystal (will be referred to as "TN liquid crystal" hereunder) whose dielectric anisotropy (a difference $\Delta\in(=\in(\|)-\in(\bot))$ between a dielectric constant $\in(\|)$ parallel to the long axis of liquid crystal molecules and dielectric constant $\in(\bot)$ perpendicular to the long axis of the liquid crystal molecules) goes positive. In the TN liquid crystal, when applied with no drive voltage, the liquid crystal molecules are aligned being nearly horizontally twisted in relation to the substrate to provide a display in white in a so-called "normally white display mode". On the other hand, when applied with a drive voltage, the liquid crystal molecules are erected perpendicularly to the substrate to provide a black level. Also in the TN liquid crystal, since it is necessary to preset a direction in which the liquid crystal molecules are to be erected when applied with a drive voltage, so the liquid crystal molecules are pretilted through about several to 10 deg. in a constant direction in practice.

Also in these days, an liquid crystal display element using a vertically-aligned liquid crystal in which a nematic liquid crystal having a negative dielectric anisotropy is vertically-aligned has been attracting attention for its high contrast and speed of response. In this vertically-aligned liquid crystal, when applied with no drive voltage, the liquid crystal molecules are aligned nearly perpendicularly to the substrate to provide a display in black in a so-called "normally black display mode". On the other hand, when applied with a drive voltage, the liquid crystal molecules are tilted in a predetermined direction to have the light transmittance thereof varied due to a birefringence developed at that time of tilting.

Also, in the vertically-aligned liquid crystal, since the contrast will not be uniform as shown in FIGS. 2 and 3 unless liquid crystal molecules 206a are tilted in the same direction, so it is necessary to vertically align the liquid crystal molecules 206a by tilting the long axis of the liquid crystal molecules 206a through a slight pretilt angle θ in a constant direction X in relation to a line normal to a drive circuit board 204 having pixel electrodes 203 formed thereon. The pretilting direction X, that is, the direction in which the liquid crystal molecules 206a are aligned, is set nearly diagonal to a device whose transmittance is normally caused to be maximum by a combination with an optical system such as a polarization plate and the like, namely, in a direction of about 45 deg. that is a nearly diagonal direction of the pixel electrodes 203 laid in the form of a nearly square matrix. Also, if the pretilt angle θ is too large, the vertical alignment will be degraded, the black level will rise to lower the contrast and adversely affect the V-T (drive voltage-transmittance) curve. Therefore, the pretilt angle θ is normally controlled to fall within a range of 1 to 5 deg.

The alignment layer which pretilts the vertically-aligned liquid crystal is an obliquely-evaporated layer formed by depositing an inorganic material such as silicon dioxide ($SiO_2$) or the like obliquely onto a substrate or a polymer layer of polyimide or the like having a rubbed surface. The pretilting and pretilt angle are controlled by controlling the direction of incidence and evaporation angle for the obliquely-evaporated layer or by controlling the rubbing direction and conditions for the polymer layer. Normally, the practical pretilt angle is about 45 to 65 deg. in relation to the light normal to the substrate.

Note here that the polyimide layer, which is an organic material, of the alignment layer is deteriorated by light as higher-intensity light is incident upon the polyimide layer, which has recently been a problem to this field of art. On the contrary, being highly stabile against light and not changeable in performance even after the liquid crystal display element has been driven, the polyimide layer which is an organic material is highly reliable for a long period and thus has been attracting attention these days in the field concerned.

Also, the aforementioned reflection type liquid crystal element 200 is normally shipped after covering the surfaces of the reflection pixel electrodes 203 on the silicon substrate with a protective layer of an oxide, nitride or the like to protect the reflection pixel electrodes formed from an aluminum film from being corroded or damaged. Conventionally, a silicon dioxide layer which is easy to form in the LSI process is used as such a protective layer.

FIG. 4 shows the results of measurement of the wavelength dependence of the reflectance of the silicon substrate having the reflection pixel electrodes 203 covered with a 50 nm-thick silicon dioxide layer, and FIG. 5 shows the results of measurement of the wavelength dependence of the reflectance of the silicon substrate after the liquid crystal display element is formed.

Normally, the waveband of light used in the liquid crystal projector is normally on the order of 430 to 700 nm. As shown in FIG. 4, however, the reflectance of the reflection pixel electrodes covered with the silicon dioxide layer is not uniform in the whole waveband but gradually decreases from the blue waveband toward the red one.

Also, the reflectance of the reflection pixel electrodes covered with the silicon dioxide layer is caused by an interference between cell gaps to still undulate as shown in FIG. 5 after the liquid crystal display element is formed but it gradually decreases from the blue waveband toward the red one in the generally same way as in FIG. 4.

That is, the reflectance deterioration in the red waveband is caused by the innate wavelength dependence of the reflectance of the aluminum from which the reflection pixel electrodes are formed.

Also, in the reflection type liquid crystal projector using the aforementioned reflection type liquid crystal element 200, illumination light is emitted from a light source to the reflection type liquid crystal element 200 and the light modulated by the reflection type liquid crystal element 200 is projected by a projection optical system onto a screen on which it will be displayed as an image.

FIG. 6 shows the characteristic curve of the emission spectrum of a high pressure mercury (UHP) lamp used mainly as the light source in the reflection type liquid crystal projector.

As will be known from FIG. 6, the emission spectrum of the UHP lamp is characterized in that the quantity of light is not constant over the waveband but it is decreased in the red waveband. Therefore, in combination with the UHP lamp, the wavelength dependence of the reflectance of the aforementioned reflection pixel electrodes will more reduce the quantity of light in the red waveband.

Thus, in the normal use of the conventional liquid crystal projector, colorization with insufficient red is unavoidable when greater importance is given to the image brightness, which results in declination of the color balance. On the contrary, in case special emphasis is placed on the color balance (white balance, for example), light of green and blue wavelengths has to be attenuated for use correspondingly to light of a red wavelength whose quantity of light is smaller even if the reflectance in the green and blue wavelengths is higher, which results in reduction of the image brightness.

OBJECT AND SUMMARY OF THE INVENTION

It is therefore an object of the present invention to overcome the above-mentioned drawbacks of the related art by providing a projection type liquid crystal display element capable of maintaining a high reflectance while preventing the color balance from being declined by a variation in wavelength dependence of the reflectance of reflection pixel electrodes.

Also, the present invention has another object to provide a liquid crystal display device including such a liquid crystal display element and thus capable of quality display of an image having a high brightness level and good color balance.

The above object can be attained by providing a liquid crystal display element including according to the present invention:

a transparent substrate having formed on a surface thereof a transparent electrode and an alignment layer covering the transparent electrode;

a drive circuit board disposed opposite to the transparent substrate and having formed on a surface thereof opposite to the transparent electrode a plurality of drive circuits and a plurality of reflection pixel electrodes, corresponding to pixels, respectively, a protective layer covering the plurality of reflection pixel electrodes and an alignment layer covering the protective layer; and a liquid crystal layer interposed between the alignment layer on the transparent substrate and the alignment layer on the drive circuit board, the protective layer being a stack of at least two dielectric layers different in refractive index from each other; and the thickness of each of the stacked dielectric layers being set to compensate the wavelength dependence of the reflectance of the reflection pixel electrodes.

Also, the above object can be attained by providing a liquid crystal display device which uses light modulated by a liquid crystal display element to display an image, the liquid crystal display element including according to the present invention:

a transparent substrate having formed on a surface thereof a transparent electrode and an alignment layer covering the transparent electrode;

a drive circuit board disposed opposite to the transparent substrate and having formed on a surface thereof opposite to the transparent electrode a plurality of drive circuits and a plurality of reflection pixel electrodes, corresponding to pixels, respectively, a protective layer covering the plurality of reflection pixel electrodes and an alignment layer covering the protective layer; and a liquid crystal layer interposed between the alignment layer on the transparent substrate and the alignment layer on the drive circuit board, the protective layer being a stack of at least two dielectric layers different in refractive index from each other; and the thickness of each of the stacked dielectric layers being set to compensate the wavelength dependence of the reflectance of the reflection pixel electrodes.

In the above liquid crystal display element according to the present invention, since the reflection pixel elements are covered with a protective layer formed from a stack of at least two dielectric layers different in refractive index from each other, and the ratio in thickness between the stacked dielectric layers is set to compensate the wavelength dependence of the reflectance of the reflection pixel electrodes, so the performance of spectral reflection can be improved with maintenance of a high reflectance.

Also, the protective layer should preferably have a structure in which first dielectric layers and second dielectric layers larger in refractive index than the first dielectric layers are alternately stacked on one another.

In this case, since the multi-reflected rays of light from the boundaries of the stacked dielectric layers are more reflected interfering with each other, the reflectance can further be improved.

Also, the reflection pixel electrodes may be formed from an aluminum film or an aluminum-based metal film and the protective layer may be a stack of a silicon dioxide layer and silicon nitride layer in this order.

In this case, since the reflection pixel electrodes are formed from the aluminum film or aluminum-based metal film, the protective layer in which the silicon dioxide layer and silicon nitride layer are stacked in this order can increase the reflectance over the waveband including the green and red wavelengths while the reflectance decreases from the blue waveband toward the red one. Thus, it is possible to improve the performance of spectral reflection of the liquid crystal display element with maintenance of a high reflectance.

More particularly, when each of the silicon dioxide and silicon nitride layers are 50 to 100 nm thick and the total thickness of the silicon dioxide and nitride layers is 115 to 175 nm thick, an optimum color balance can be attained with maintenance of a high reflectance.

Also, the alignment layer at the drive circuit substrate may be formed from an obliquely-evaporated silicon dioxide layer.

In this case, on the reflection pixel electrodes, there are stacked a silicon dioxide layer of a low refractive index, silicon nitride layer of a high refractive index and a silicon dioxide of the low refractive index in this order. Therefore, since the multi-reflected rays of light from the boundaries of the stacked dielectric layers are more reflected interfering with each other, the reflectance can further be improved.

Also, using light modulated by the aforementioned liquid crystal display element, the liquid crystal display device according to the present invention can provide a quality display of an image having a high brightness level and good color balance.

BRIEF DESCRIPTION OF THE DRAWINGS

These objects and other objects, features and advantages of the present invention will become more apparent from the following detailed description of the preferred embodiments of the present invention when taken in conjunction with the accompanying drawings, in which:

FIG. 3 shows a direction in which liquid crystal molecules are aligned, in which

DETAILED DESCRIPTION OF THE PREFERRED EMBODIMENTS

The present invention will be described in detail below concerning a liquid crystal display element and liquid crystal display device with reference to the accompanying drawings.

Figure 7:
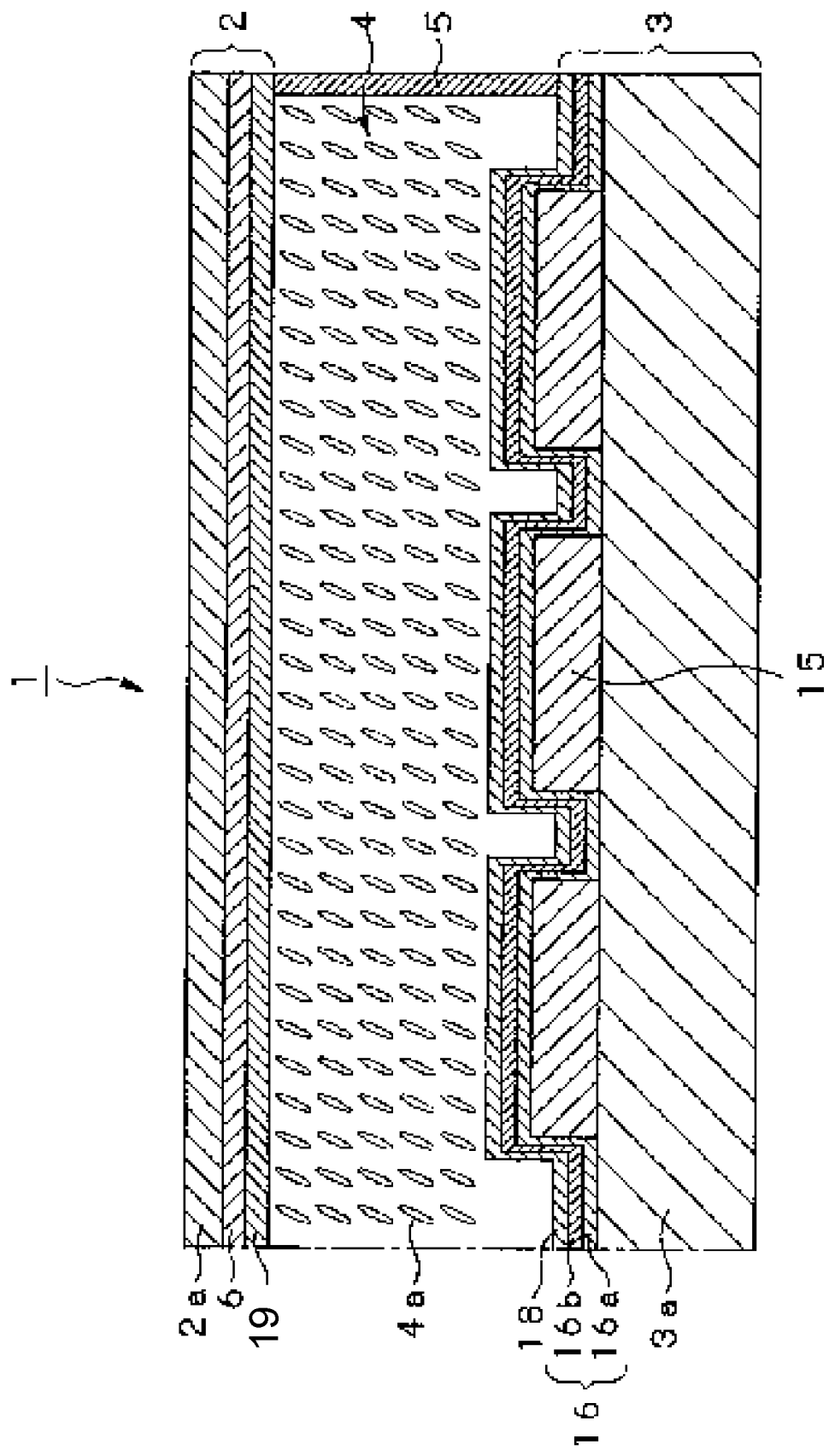
FIG. 7 is a sectional view of the reflection type liquid crystal element according to the present invention.

Referring now to FIG. 7, there is schematically illustrated a reflection type liquid crystal element of an active type according to the present invention in the form of a sectional view. The reflection type liquid crystal display element is generally indicated with a reference numeral 1. It should be noted that for easier understanding of the features of the reflection type liquid crystal display element 1, the characterizing portions are illustrated on an enlarged scale and hence all the portions are not shown at the same scale ratio in FIG. 7 as the one used in the actual element.

As shown, the reflection type liquid crystal display element 1 includes a transparent substrate 2 and drive circuit board 3, disposed opposite to each other, a liquid crystal layer 4 interposed between the transparent substrate 2 and drive circuit board 3, and a sealing member 5 that seals the ends of the transparent substrate 2 and drive circuit board 3.

The transparent substrate 2 includes a glass substrate 2a having a light-transparent electrode 6 formed over a surface thereof opposite to the drive circuit board 3. The transparent electrode 6 is formed from an electrically-conductive transparent material such as ITO (indium-tin oxide) or the like which is a solid solution of tin oxide ($SnO_2$) and indium oxide ($In_2O_3$), for example, and is to be applied to the entire pixel area thereof with a common potential (ground potential, for example).

Figure 8:
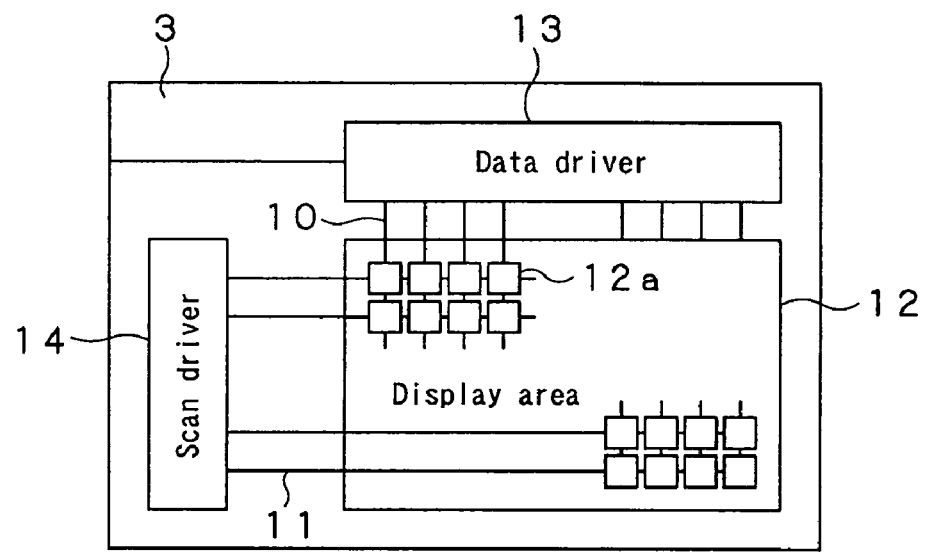
FIG. 8 is a schematic diagram of the drive circuit board included in the reflection type liquid crystal display element in FIG. 7.
Figure 9:
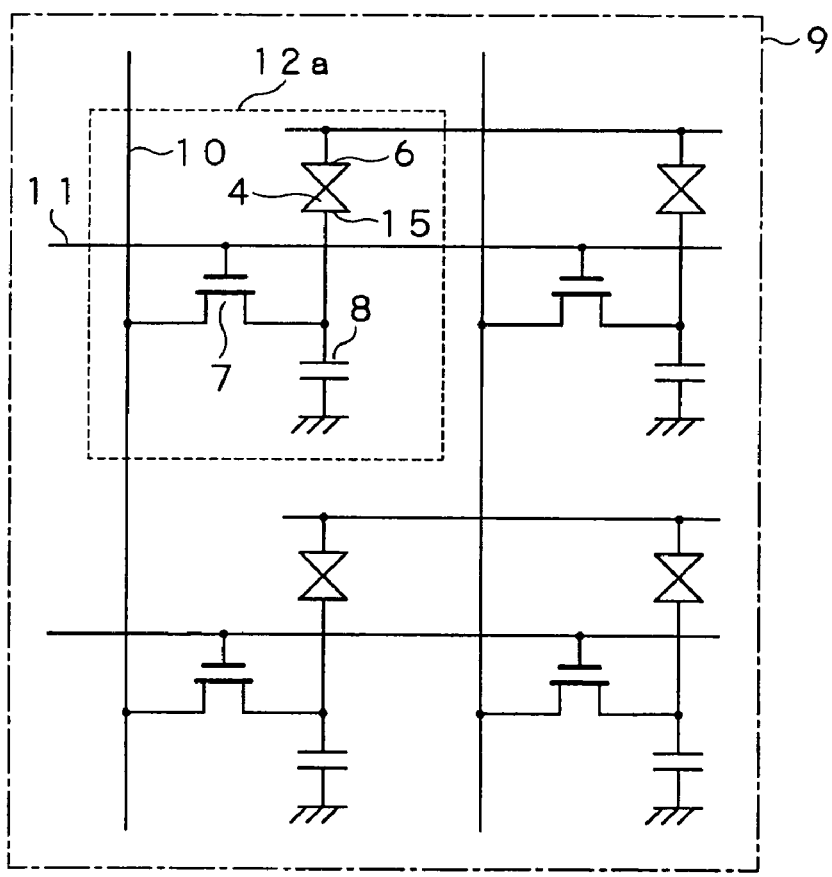
FIG. 9 is a circuit diagram of a switching drive circuit included in the reflection type liquid crystal display element in FIG. 7.

As shown in FIGS. 7, 8 and 9, the drive circuit board 3 includes a silicon substrate 3a having formed thereon, for each of a plurality of pixels, a switching drive circuit 9 including an FET (field effect transistor) 7 of a C-MOS (complementary-metal oxide semiconductor) or of an n-channel MOS type and an auxiliary capacitor 8 to apply a voltage to the liquid crystal layer 4. Namely, lines and columns of the switching drive circuits 9 form together a matrix. Also, on the silicon substrate 3a, there are formed a plurality of signals lines 10 electrically connected to sources of the FETs 7 and a plurality of scanning lines 11 electrically connected to gates of the FETs 7. The direction in which the signal lines extend is perpendicular to the direction in which the scanning lines 11 extend. The intersection between each signal line 10 and scanning line 11 corresponds to each of pixels 12a, and the pixels 12a are disposed in the form of a matrix to define a rectangular display area 12. Further, outside the display area 12, there is formed a logic section including a signal driver 13 to apply a display voltage to each of the signal lines 10 and a scan driver 14 to apply a selection pulse to each of the scanning lines 11. It should be noted that the switching drive circuit 9 is normally produced in a process in which there is required a higher dielectric strength than that of the logic circuit because the transistor has to have a dielectric strength corresponding to the drive voltage applied to the liquid crystal layer 4.

Also, on the silicon substrate 3a, there is formed a plurality of generally-rectangular reflection pixel electrodes 15 electrically connected to drains of the FETs 7, forming a matrix for each of the pixels 12a. The reflection pixel electrodes 15 are formed from a metal film of aluminum (Al) or a metal film containing aluminum (Al) as the base, each having a high reflectance in the visible region. The reflection pixel electrodes 15 function to reflect incident light from the transparent substrate 2, and apply a voltage to the liquid crystal layer 4.

Note that in this embodiment, the reflection pixel electrodes 15 are formed from a generally rectangular aluminum layer. Also, the side length of the reflection pixel electrodes 15 is about 8.4 μm and the gap between the adjacent reflection pixel electrodes 15, namely, the so-called pixel space, is about 0.6 μm (normally, 0.3 to 0.7 μm) by way of example. Therefore, the pixel pitch defined between adjacent reflection pixel electrodes 15 is about 9 (=8.4+0.6) μm (normally about 7 to 15 μm). Also, the reflection pixel electrodes 15 are about 150 to 250 nm thick.

Also, on the surface of the drive circuit board 3, opposite to the transparent substrate 2, there is formed a protective layer 16 that covers the reflection pixel electrodes 15. The protective layer 16 has a two-layer structure in which a silicon dioxide layer 16a as a first dielectric layer and a silicon nitride layer 16b being a second dielectric layer and larger in refractive index than the first dielectric layer. It should be noted that of the protective layer 16, the silicon dioxide layer 16a has a refractive index of about 1.5 while the silicon nitride layer 16b has a refractive index of about 1.9. Also, the silicon dioxide and nitride layers 16a and 16b are sequentially formed with the thin film deposition technique used in the LSI process for the plasma CVD or the like, for example, to cover the entire surface of the reflection pixel electrodes 15.

Also, on the surfaces, opposite to each other, of the transparent substrate 2 and drive circuit board 3, there are formed alignment layers 18 and 19, respectively, which cover the transparent electrode 6 and protective layer 16, respectively. To align liquid crystal molecules 4a, which will further be described later, of the liquid crystal layer 4 in a predetermined direction, each of the alignment layers 18 and 19 is an obliquely-evaporated layer formed by depositing an inorganic material such as silicon dioxide or the like obliquely onto the substrates 2 and 3 or a polymer layer of polyimide or the like having a rubbed surface. It should be noted that the direction and angle, in which and at which the liquid crystal layer 4 is to be pretilted, are controlled by controlling the incidence direction and evaporation angle in the oblique evaporation for the obliquely-evaporated layer or by controlling the rubbing direction and conditions for the polymer layer. Normally, the practical pretilt angle is about 45 to 65 deg. in relation to the line normal to the substrates. It should be noted that each of the alignment layers 18 and 19 is a silicon dioxide layer of about 50 nm in thickness, for example, formed by the oblique evaporation.

Figure 2:
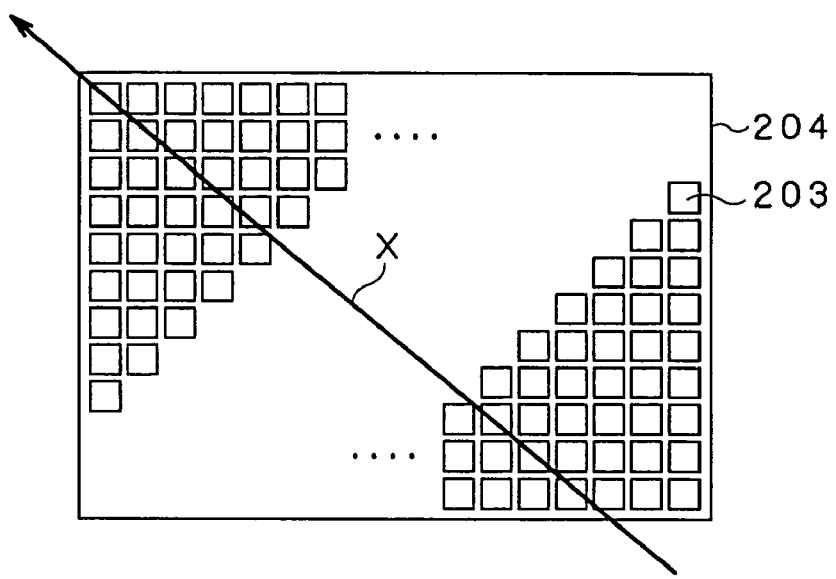
FIG. 2 is a plan view of the drive circuit board, showing a direction in which a vertically-aligned liquid crystal is pretilted.
Figure 3A:
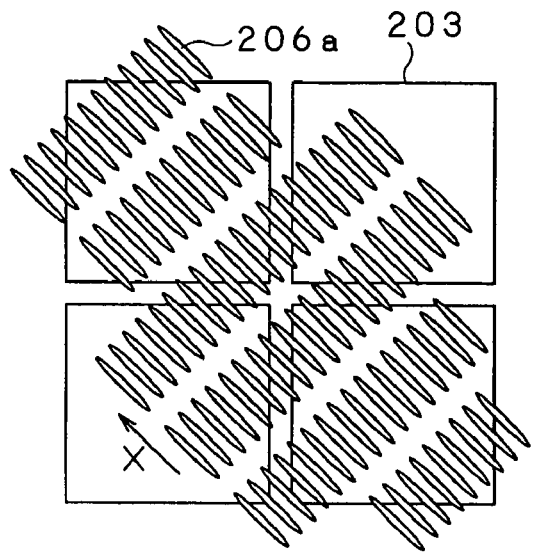
FIG. 3A is a plan view of a liquid crystal composed of the liquid crystal molecules and FIG. 3B is a side elevation of the liquid crystal.
Figure 3B:
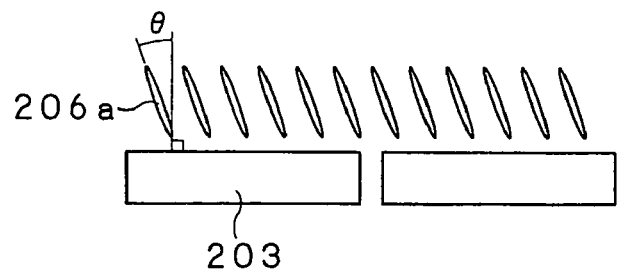

The liquid crystal layer 4 is formed by injecting a liquid crystal between the alignment layer 18 at the transparent electrode 6 and the alignment layer 19 at the reflection pixel electrodes 15. The liquid crystal layer 4 is formed from a vertically-aligned liquid crystal in which nematic liquid crystal having a negative dielectric anisotropy is vertically-aligned by the above-mentioned alignment layers 18 and 19. In this vertically-aligned liquid crystal, when applied with no drive voltage, the liquid crystal molecules 4a are aligned nearly perpendicularly to the silicon substrate 3a to provide a display in black in a so-called "normally black display mode". On the other hand, when applied with a drive voltage, the liquid crystal molecules 4a are tilted in a predetermined direction to have the light transmittance thereof varied due to a birefringence developed at that time of tilting. Also, in the vertically-aligned liquid crystal, since the light-dark pattern will not be uniform as shown in FIGS. 2 and 3 unless liquid crystal molecules 4a are tilted in the same direction, so the liquid crystal is vertically-aligned by giving a slight pretilt angle θ in a constant direction X to tilt the long axis of the liquid crystal molecules 4a in relation to a line normal to the drive circuit board 3 having the reflection pixel electrodes 15 formed thereon. The pretilting direction X, that is, the direction in which the liquid crystal molecules 4a are to be aligned, is set nearly diagonal to the display area 12 where the transmittance is caused to be maximum by a combination with an optical system such as a polarization plate and the like, namely, in a direction of about 45 deg. that is a nearly diagonal direction of the reflection pixel electrodes 15. Also, if the pretilt angle θ is too large, the vertical alignment will be degraded, the black level will rise to lower the contrast and the V-T (drive voltage-transmittance) curve will be adversely affected. Therefore, the pretilt angle θ is normally controlled to fall within a range of 1 to 7 deg.

The sealing member 5 is formed from an epoxy resin or the like to form a sealing of several micrometers in thickness between the alignment layers 18 and 19 with an appropriate number of glass beads (not shown) being dispersed between the transparent substrate 2 and drive circuit board 3. A liquid crystal is injected into this assembly sealed with the sealing member 5 to form the liquid crystal layer 4. It should be noted that the sealing member 5 may be formed to cover the side faces of the alignment layers 18 and 19.

In the reflection type liquid crystal display element 1 constructed as above, incident light from is reflected by the reflection pixel electrodes 15 at the drive circuit board 3 while passing by the liquid crystal layer 4. Then, the reflected light travels in a direction opposite to its direction of incidence, passes by the liquid crystal layer 4 and transparent substrate 2, and outgoes from the transparent substrate 2. At this time, the liquid crystal layer 4 has the optical characteristic thereof varied correspondingly to a potential difference of a drive voltage applied between the transparent electrode 6 and reflection pixel electrodes 15 to modulate the passing light. Therefore, the reflection type liquid crystal display element 1 can assign intensity levels by the above-mentioned light modulation, and utilize the modulated reflected light for displaying an image.

Note here that in this reflection type liquid crystal display element 1, the ratio in thickness between the silicon dioxide layer 16a and silicon nitride layer 16b in the protective layer 16 covering the reflection pixel electrodes 15 is set to compensate the wavelength dependence of the reflectance of the reflection pixel electrodes 15.

Thus, the reflection type liquid crystal display element 1 can be improved to compensate the performance of spectral reflection while maintaining a high reflectance.

That is, in this reflection type liquid crystal display element 1, the wavelength dependence of the reflectance of the reflection pixel electrodes 15 can be compensated, and thus the color balance be adjusted, by optimizing the ratio in thickness between the silicon dioxide layer 16a and silicon nitride layer 16b and the total thickness of the layers 16a and 16b.

Figure 4:
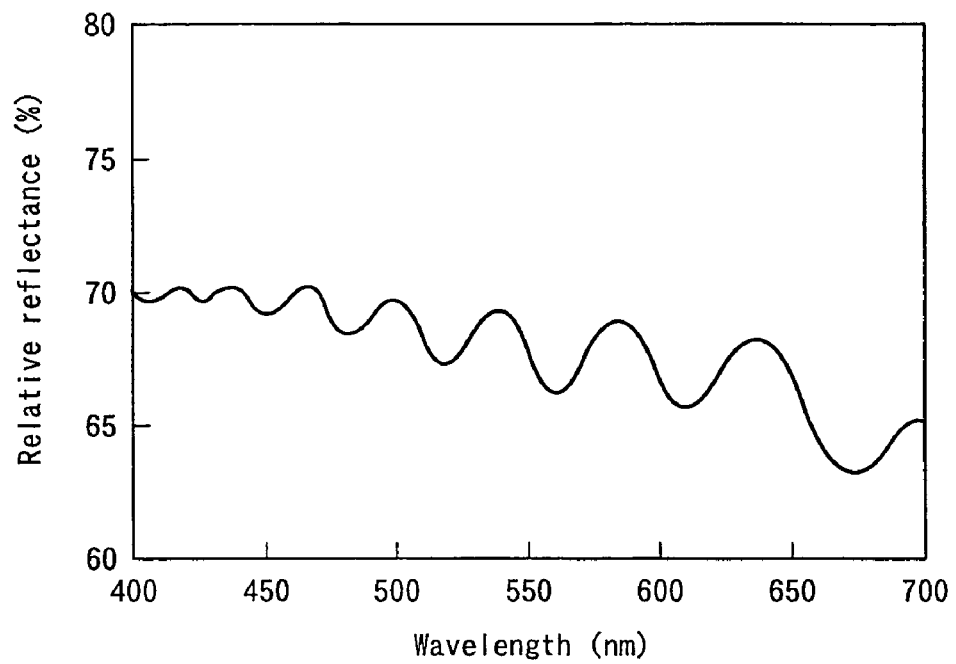
FIG. 4 shows the characteristic curve showing the waveform dependence of the reflectance of a silicon substrate in which a reflection pixel electrode is covered with a silicon dioxide layer.
Figure 5:
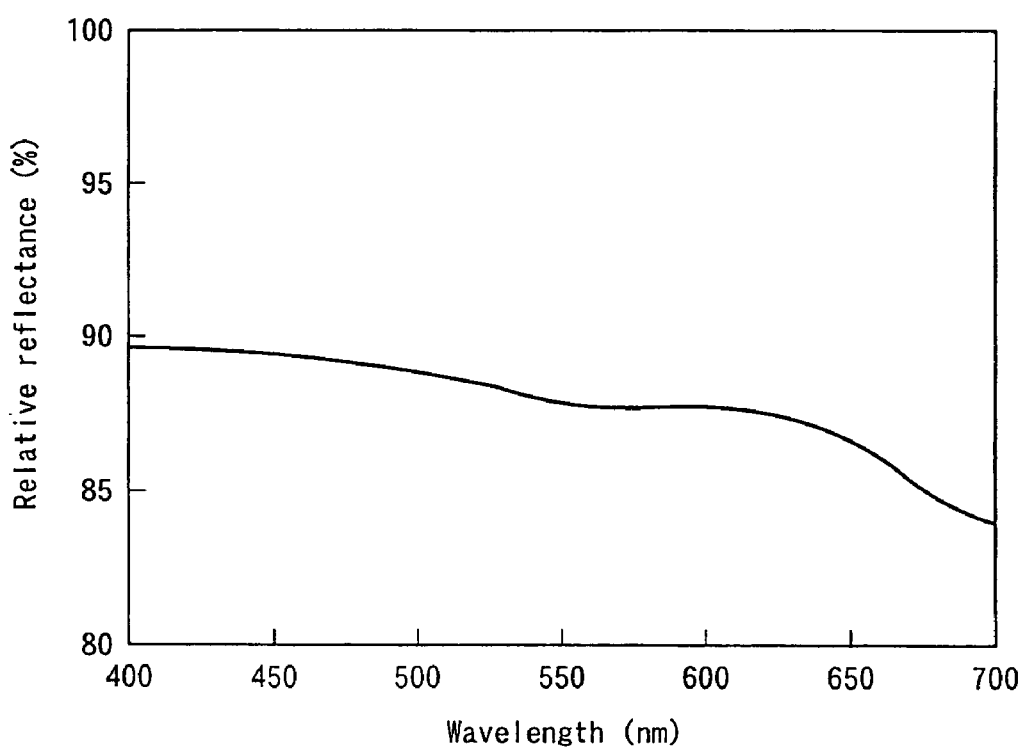
FIG. 5 shows the characteristic curve showing the waveform dependence after the reflection type liquid crystal display element is formed.
Figure 6:
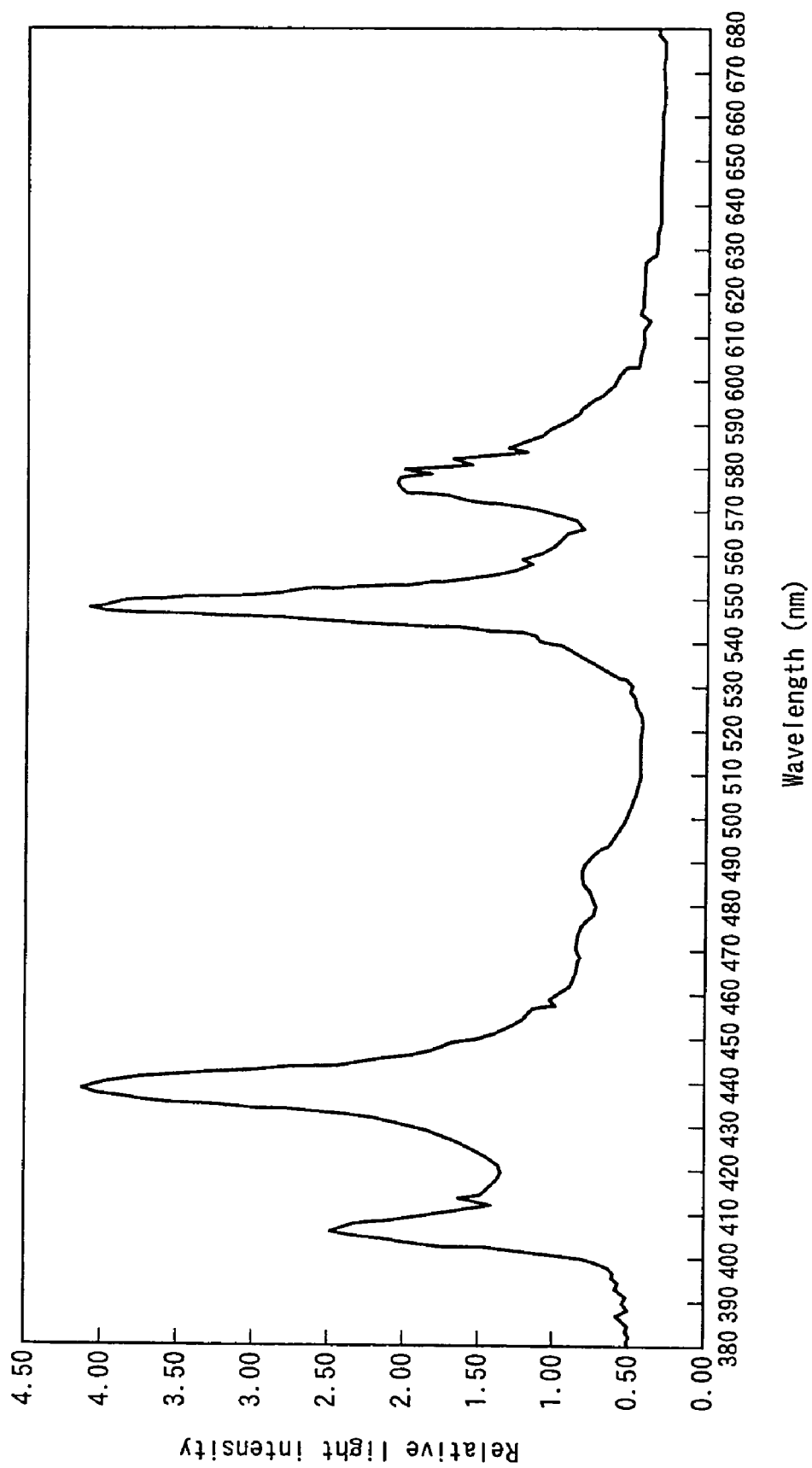
FIG. 6 shows the characteristic curve showing the emission spectrum of a UHP lamp.

More specifically, since the reflection pixel electrodes 15 in this reflection type liquid crystal display element 1 are formed from an aluminum film or aluminum-based metal film, the reflectance gradually decreases from the blue waveband toward the red waveband as shown in FIGS. 4 and 5 showing the results of measurements. On the other hand, the protective layer 16 formed from the silicon dioxide layer 16a and silicon nitride layer 16b stacked in this order permits to increase the reflectance over the green and red wavebands.

Therefore, in this reflection type liquid crystal display element 1, the reflectance can be generally uniformized in a wide range extending from the blue to red waveband through the green waveband, and thus the color can be well balanced.

The Inventors of the present invention prepared samples whose the ratios in thickness between the silicon dioxide layer 16a and silicon nitride layer 16b of the protective layer 16 covering the reflection pixel electrodes 15 were different from each other, and measured the wavelength dependence of the reflectance of the reflection pixel electrodes 15. Also, they prepared samples in which the reflection pixel electrodes 16 are covered with only the silicon dioxide layer 16a as in the conventional liquid crystal display elements, and measured the wavelength dependence of the reflectance. The thickness of the protective layers 16 in these samples 1 to 6 is as shown in Table 1.

TABLE 1

| Sample | Silicon oxide layer thickness (nm) | Silicon nitride layer thickness (nm) | Sum of silicon dioxide and nitride layer thickness (nm) |
|---|---|---|---|
| 1 | 50 | — | 50 |
| 2 | 75 | 75 | 150 |
| 3 | 50 | 100 | 150 |
| 4 | 100 | 50 | 150 |
| 5 | 80 | 100 | 180 |
| 6 | 50 | 60 | 110 |

Note that for preparing the above samples 1 to 6, there were made a glass substrate having a transparent electrode formed thereon by depositing ITO (indium-tin oxide), and a silicon substrate having a thickness-controlled protective layer formed thereon with the plasma CVD technique, and these substrates were washed. Thereafter, an alignment layer of silicon dioxide was formed on each of the substrates with the oblique evaporation technique using an evaporation apparatus. It should be noted that the pixel pitch on the reflection pixel electrodes was 9 μm and the space C between the pixels is 0.6 μm. The orientation or second alignment layer 19 was 50 nm thick, and the evaporation angle of the alignment layer was controlled to fall within a range of 55 deg. for the liquid crystal to be pretilted through an angle of about 2.5 deg. Also, the liquid crystal was pretilted nearly diagonally to the reflection pixel electrodes, namely, in a direction in which the liquid crystal molecules are aligned. Next, glass beads of 2 μm in diameter ware dispersed between both the substrates having the alignment layers formed thereon, and the substrates being laid opposite to each other were at the ends thereof sealed with a sealing material such as epoxy resin. Further, a nematic liquid crystal material having a negative dielectric anisotropy, available from the Merck & Co. Inc. was injected between the substrates thus sealed, thereby making a reflection type liquid crystal element of 2 μm in cell thickness.

Figure 10:
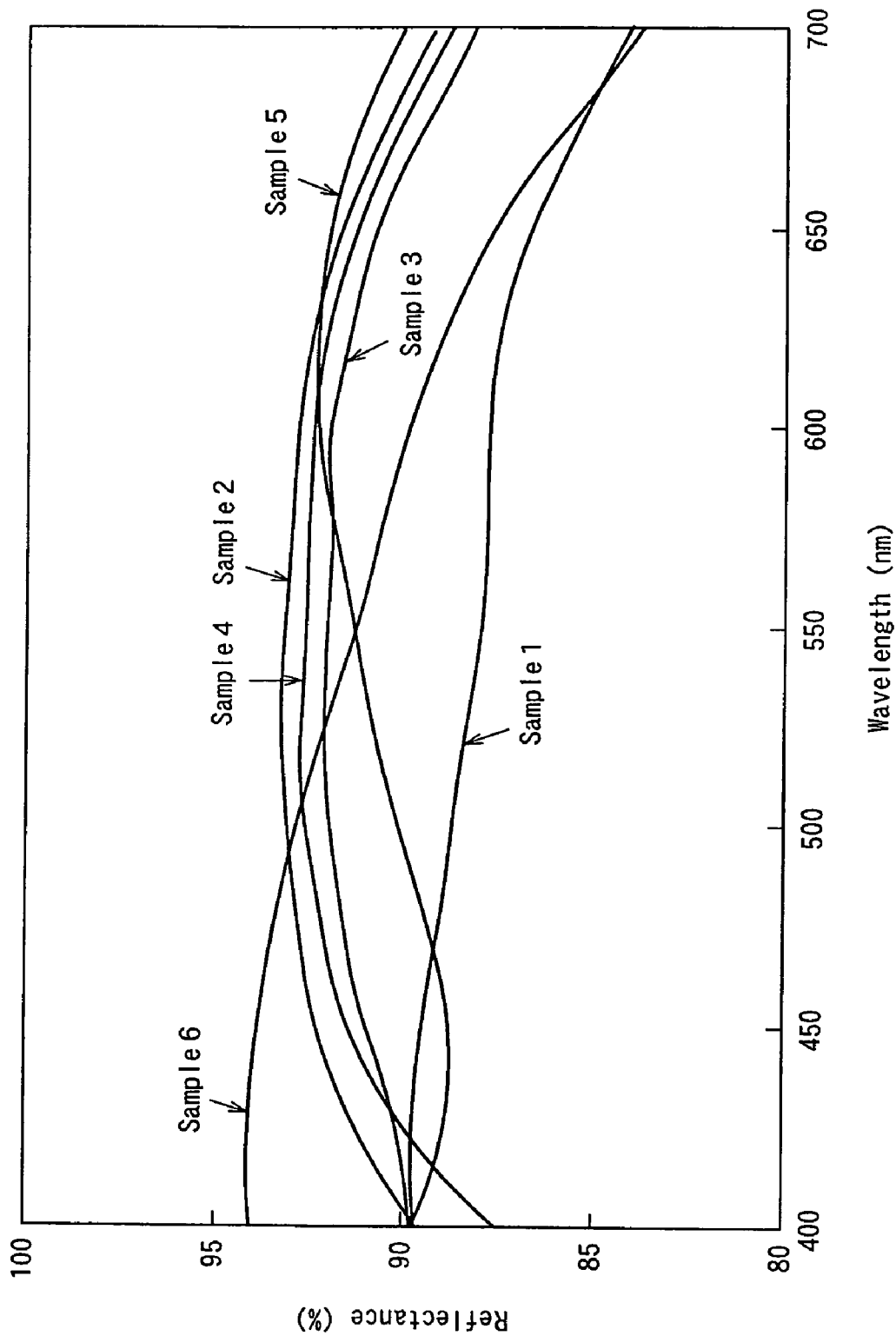
FIG. 10 shows a characteristic curve showing the waveform dependence of the reflectance of the silicon substrates in which reflection pixel electrodes formed from samples 1 to 6 are covered each with a protective layer.

Each of the samples 1 to 6 was tested on the wavelength dependence of the reflectance of the silicon substrate having the reflection pixel electrodes covered with the protective layer. The test results are shown in FIG. 10. Also, each of the samples 1 to 4 prepared as above was tested on the wavelength dependence of the reflectance of the reflection pixel electrodes. The test results are shown in FIG. 11.

Figure 11:
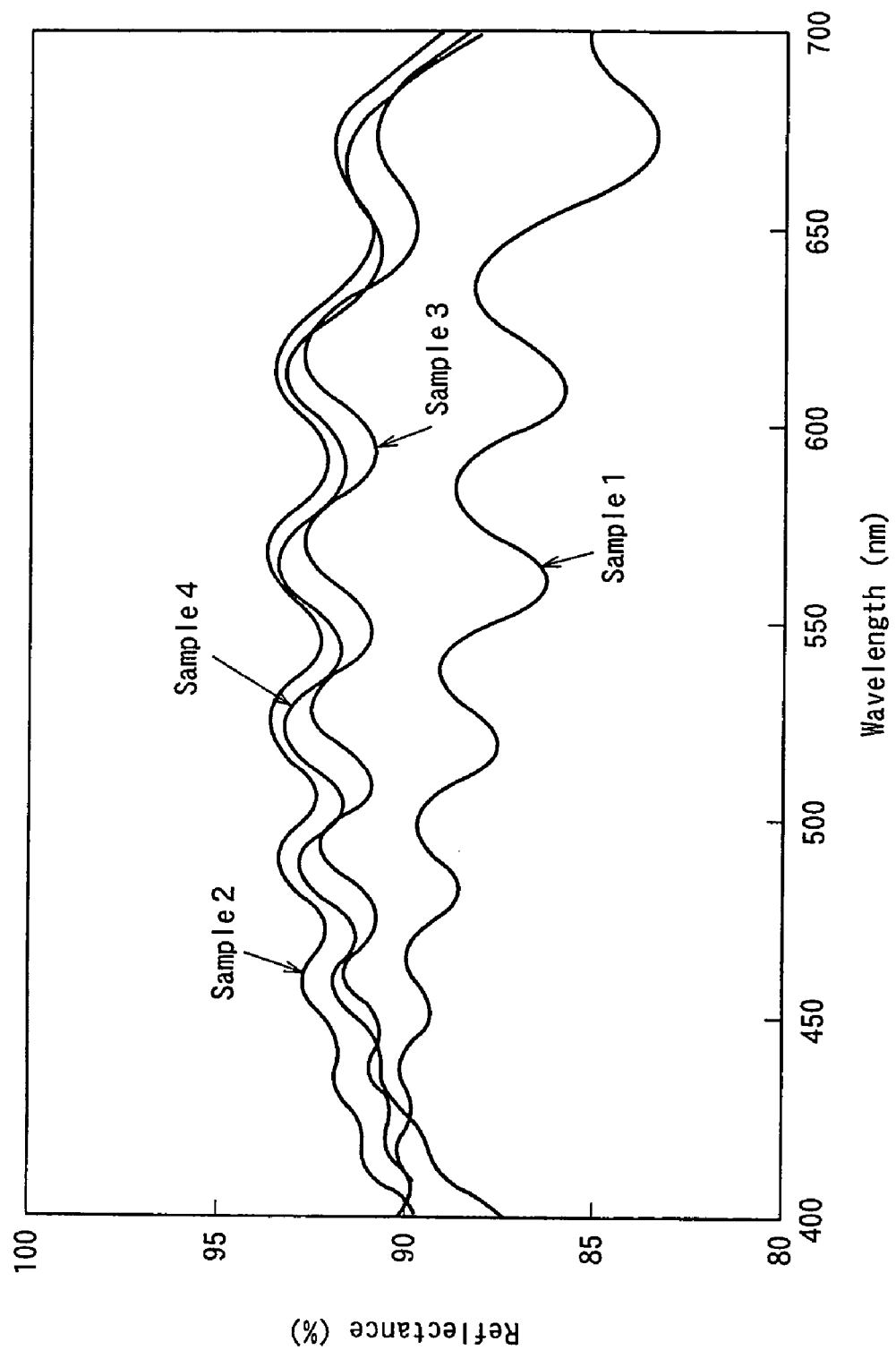
FIG. 11 shows a characteristic curve showing the waveform dependence of the reflectance after reflection type liquid crystal elements are formed from samples 1 to 4.

As seen from FIGS. 10 and 11, in case the reflection pixel electrodes 15 are covered with only the silicon dioxide layer 16a as in the sample 1, the reflectance will not be constant over the entire waveband but it will be lower from the blue waveband toward the red waveband.

On the other hand, in the samples 2 to 6, the total thickness of the silicon dioxide and nitride layers 16a and 16b has an influence on the wavelength dependence of the reflectance. As the total thickness is larger, the peak reflectance shifts from a smaller wavelength toward a larger one.

Also, in case the total thickness of the silicon dioxide and nitride layers 16a and 16b is increased to about 180 nm as in the sample 5, the reflectance in the blue waveband will be lower than that in the red waveband. On the contrary, in case the total thickness of the silicon dioxide and nitride layers 16a and 16b is decreased to about 110 nm as in the sample 6, the reflectance in the red waveband will be lower than that in the blue waveband.

Therefore, when the total thickness of the silicon dioxide and nitride layers 16a and 16b is within the range of 115 to 175 nm as in the samples 2 to 4, the reflectance has a moderate peak in the green waveband and a generally uniform reflectance in a wide range from the blue to red waveband.

Also, if the total thickness of the silicon dioxide and nitride layers 16a and 16b is too large, a burn will be caused by a dielectric polarization at each layer boundary. For example, a burn was found after having driven the liquid crystal display element for a time longer than 1000 hours. On this account, each of the silicon dioxide and nitride layers 16a and 16b should preferably be 100 nm or less for the stability of these layers. On the contrary, if the silicon dioxide and nitride layers 16a and 16b are too thin, their quality will be poor in quality. Therefore, for a higher quality, each of the silicon dioxide and nitride layers 16a and 16b should preferably have a thickness of 50 nm or more.

The results of the Inventors' measurements have revealed that in the protective layer 16, each of the silicon dioxide and nitride layers 16a and 16b should preferably be 50 to 100 nm thick and the total thickness of these layers should preferably be 115 to 175 nm.

Thus, the reflection type liquid crystal display element 1 can have an improved performance of spectral reflection with maintenance of a high reflectance, and can attain an optimum color balance.

Note that since the silicon nitride layer 16b is more solid and has a higher moisture resistance than the silicon dioxide layer 16a, forming the protective layer 16 from a stack of the silicon dioxide layer 16a and silicon nitride layer 16b can assure an improved moisture resistance and longer preservation of the protective layer 16 than forming the latter from only the silicon dioxide layer 16a.

Also, the protective layer 16 is a structure formed from a stack of the silicon dioxide layer 16a as a first dielectric layer and the silicon oxide layer 16b as a second dielectric layer having a larger refractive index than the first dielectric layer. In this case, since the multi-reflected rays of light from the boundaries of the stacked layers are more reflected interfering with each other, the reflectance can further be improved.

Further in this reflection type liquid crystal display element 1, since the alignment layer 19 at the aforementioned drive circuit board 3 is formed from a silicon dioxide layer, the silicon dioxide layer 16a of a low refractive index, silicon nitride layer 16b of a high refractive index and a silicon dioxide layer 18 of the low refractive index are alternately stacked on the reflection pixel electrodes 15. This structure is a so-called mirror structure. Thus, in the reflection type liquid crystal display element 1, the larger the number of layers, the more the multi-reflected rays of light from the boundaries of the stacked layers will be reflected as above, resulting in further improvement of the reflectance.

Note that the protective layer 16 is not necessarily limited to the aforementioned silicon dioxide layer 16a and silicon nitride layer 16b stacked in this order, but it may be a stack of at least two dielectric layers different in refractive index from each other. By setting a ratio in thickness between these stacked dielectric layers to compensate the wavelength dependence of the reflectance of the reflection pixel electrodes 15, the reflection type liquid crystal display element 1 can have an improved performance of spectral reflection with maintenance of a high reflectance.

Figure 12:
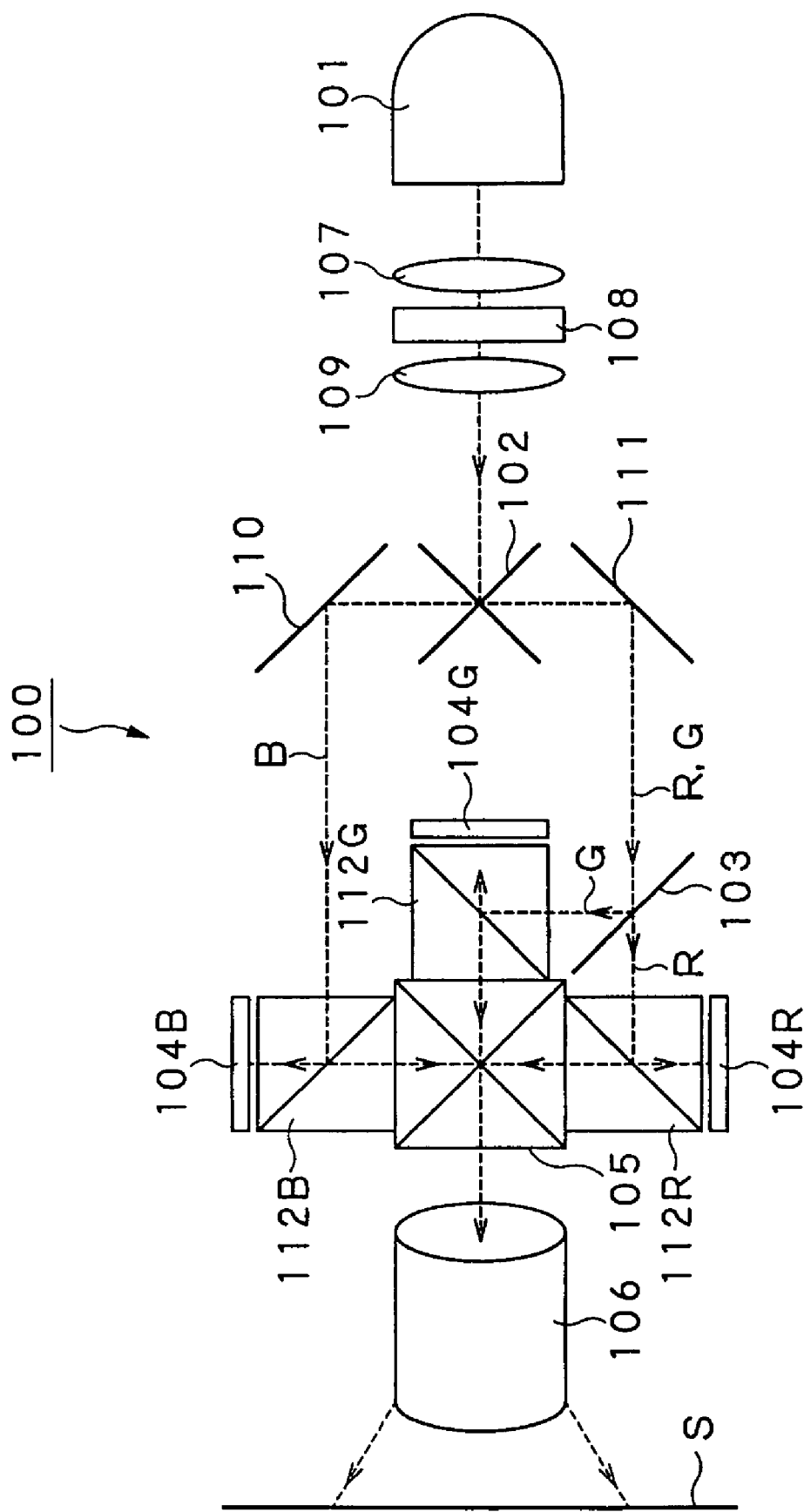
FIG. 12 is a block diagram of the substantial part of liquid crystal projector according to the present invention.

Next, the present invention will be illustrated and explained concerning the liquid crystal display device. The liquid crystal display device is embodied as a reflection type liquid crystal projector. It is generally indicated with a reference numeral 100 as shown in FIG. 12 for example.

The reflection type liquid crystal projector 100 is of a so-called three-panel type. It is a reflection type liquid crystal display device using the aforementioned reflection type liquid crystal display element 1 as each of three liquid crystal display panels corresponding to three primary colors (red, green and blue) to project a color image for display on a larger scale onto a screen S.

As shown, the reflection type liquid crystal projector 100 includes a lamp 101 provided as a light source to emit illumination light, a dichroic color separation filter 102 and dichroic mirror 103, provided as a light separation means for splitting the illumination light from the lamp 101 into red light (R), green light (G) and blue light (B), liquid crystal display panels 104R, 104G and 104B provided correspondingly to color rays of light (R, G and B), respectively, to modulate the separated red light (R), green light (G) and blue light (B) on the basis of video data, a synthesizing prism 105 to synthesize the modulated red light (R), green light (G) and blue light (B) into one image, and a projection lens 106 to project the synthetic illumination light onto the screen S.

The lamp 101 emits white light including red light (R), green light (G) and blue light (B). It is a high-intensity discharge lamp (UHP) such as a halogen lamp, metal halide lamp, xenon lamp, high-pressure mercury lamp or the like, for example.

Also, in the light path between the lamp 101 and dichroic color separation filter 102, there are provided a fly-eye lens 107 to uniformly distribute the illumination light emitted from the lamp 101, a polarization changing element 108 to convert P- and S-polarized light components of the illumination light into one of the polarized light components (S-polarized light component, for example), a condenser lens 109 to condense the illumination light, etc.

The dichroic color separation filter 102 functions to separate the white light emitted from the lamp 101 into blue light (B) and other color rays of light (R and G), and it reflects the separated blue light (B) and other color rays of light (R and G) in opposite directions, respectively.

Also, between the dichroic color separation filter 102 and liquid crystal display panel 104B, there is provided a total-reflection mirror 110 to reflect the separated blue light (B) toward the liquid crystal display panel 104B. In addition, between the dichroic color separation filter 102 and dichroic mirror 103, there is provided a total-reflection mirror 111 to reflect the separated other color rays of light (R and G) toward the dichroic mirror 103.

The dichroic mirror 103 functions to separate the other color rays of light (R and G) into red light (R) and green light (G), and it allows the separated red light (R) to pass by toward the liquid crystal display panel 104R while reflecting the separated green light (G) toward the liquid crystal display panel 104G.

Also, between each of the liquid crystal display panels 104R, 104G and 104B and the synthesizing prism 105, there are provided polarizing beam splitters 112R, 112G and 112B to guide each of the separated color rays of light (R, G and B) to each of the liquid crystal display panels 104R, 104G and 104B.

The polarizing beam splitters 112R, 112G and 112B function to separate the incident color rays of light (R, G and B) into P- and S-polarized light components, and they reflect one of the polarized light components (S-polarized light component, for example) toward each of the liquid crystal display panels 104R, 104G and 104B and allow the other polarized light component (P-polarized light component, for example) to pass by toward the synthesizing prism 105.

Each of the liquid crystal display panels 104R, 104G and 104B includes the aforementioned reflection type liquid crystal display element 1. They make polarization modulation of one of the polarized light components (S-polarized light component, for example) guided by the polarizing beam splitters 112R, 112G and 112B on the basis of a video signal, and reflect light resulted from the polarization modulation toward the polarizing beam splitters 112R, 112G and 112B.

The synthesizing prism 105 is a so-called cross-cube prism. It functions to synthesize color rays of light (R, G and B) of the other modulated light component (P-polarized light component, for example) having passed by the polarizing beam splitters 112R, 112G and 112B, and it lets the synthetic light go out toward the projection lens 106. More particularly, the synthesizing prism 105 is composed of four right-angle prisms attached together, and has formed on each of the surfaces, attached to each other, of the component prisms a dichroic layer which will reflect light having a specific wavelength. The synthesizing prism 105 synthesizes these color rays of light (R, G and B) into one image by reflecting red light (R) modulated by the liquid crystal display panel 104R toward the projection lens 106, allowing green light (G) modulated by the liquid crystal display panel 104G to pass by toward the projection lens 106, and reflecting blue light (B) modulated by the liquid crystal display panel 104B toward the projection lens 106.

Note that in the reflection type liquid crystal projector 100, the green image from the liquid crystal display panel 104G is displayed being horizontally inverted in relation to the red and blue images from the liquid crystal display panels 104R and 104B so that the image synthesized by the synthesizing prism 105 will coincide with the green image on the screen S.

The projection lens 106 functions to project the light from the synthesizing prism 105, on a larger scale, toward the screen S.

Note that in this reflection type liquid crystal projector 100, the liquid crystal display elements 104R, 104G and 104B, synthesizing prism 105 and polarizing beam splitters 112R, 112G and 112B are integrated together to form one optical block. Because of this integral optical block, the reflection type liquid crystal projector 100 is designed more compact.

In the reflection type liquid crystal projector 100 constructed as above, the dichroic color separation filter 102 and dichroic mirror 103 separate white light emitted from the lamp 101 into red light (R), green light (G) and blue light (B). The red light (R), green light (G) and blue light (B) thus separated are S-polarized components, and pass by the polarizing beam splitters 112R, 112G and 112B and are incident upon the liquid crystal display panels 104R, 104G and 104B, respectively. The red light (R), green light (G) and blue light (B) incident upon the liquid crystal display panels 104R, 104G and 104B, respectively, undergo polarization modulation correspondingly to a drive voltage applied to each pixel of the liquid crystal display panels 104R, 104G and 104B on the basis of video data, and then reflected toward the polarizing beam splitters 112R, 112G and 112B. Only P-polarized light components of the red light (R), green light (G) and blue light (B) thus modulated will be allowed to pass by the polarizing beam splitters 112R, 112G and 112B, respectively, be synthesized by the synthesizing prism 105 into one image, and the light thus synthesized be projected through the projection lens 106 onto the screen S. Thus, a color image will be displayed on a larger scale on the screen S.

As having been described above, the reflection type liquid crystal projector 100 using the aforementioned reflection type liquid crystal display element 1 as the liquid crystal display panels 104R, 104G and 104B, it is possible to make generally uniform the reflectance in a wide range extending from the blue to the red waveband through the green waveband without any reduction of the reflectance of the liquid crystal display panels 104R, 104G and 104B. Therefore, this reflection type liquid crystal projector 100 can provide a quality display at a high intensity level and excellent color balance (especially, white balance).

Figure 1:
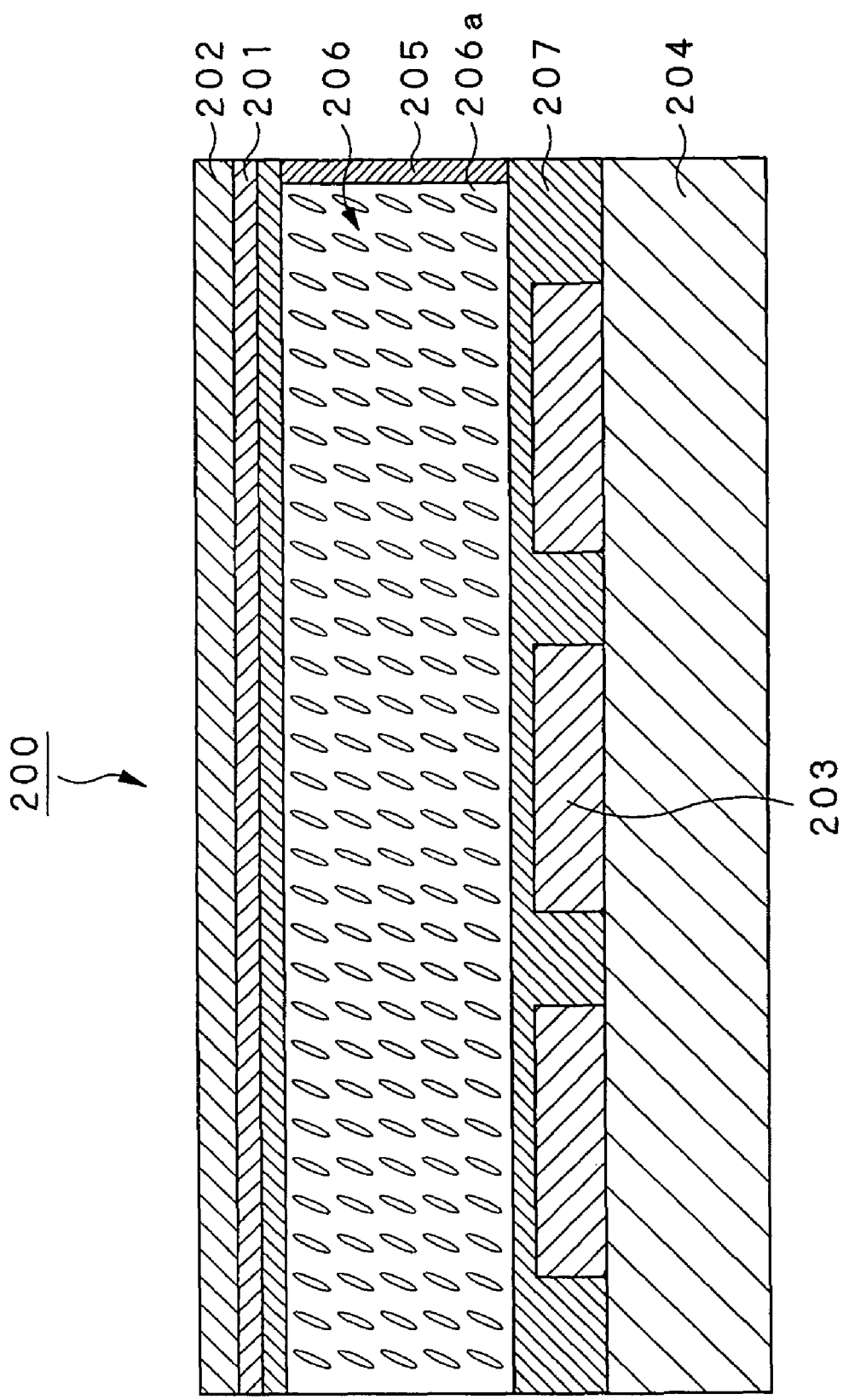
FIG. 1 is a sectional view of the conventional reflection type liquid crystal display element.

Also, in the aforementioned reflection type liquid crystal projector 100, in case an UHP lamp is used as the lamp 101, the amount of light in the red waveband will be smaller because of the emission spectrum of the UHP lamp shown in FIG. 1 but it is possible to improve the intensity level (brightness) and optimize the color balance by improving the performance of spectral reflection of the liquid crystal display panels 104R, 104G and 104B correspondingly to the emission spectrum of the UHP lamp.

Note that the present invention is not limited to the aforementioned reflection type liquid crystal display element 1 using the vertically-aligned liquid crystal, but it is applicable to a reflection type liquid crystal display element (liquid crystal optoelectronic element) which modulates incident light and emits it as reflected light as well as to a liquid crystal display device which uses such a liquid crystal display device to display an image, irrespective of the aforementioned type of liquid crystal.

Also, the present invention is not limited to the reflection type liquid crystal display device such as the aforementioned reflection type liquid crystal projector 100 in which light modulated by the liquid crystal display element is projected onto a screen to display an image, but it is applicable to a direct-view type liquid crystal display device using the liquid crystal display element according to the present invention and in which the user can view directly the liquid crystal display element.

What is claimed is:

1. A liquid crystal display element comprising:
    a transparent substrate having formed on a surface thereof a transparent electrode and a first alignment layer covering the transparent electrode;
    a drive circuit board disposed in opposition to the transparent substrate and having formed on a surface thereof facing the transparent electrode a plurality of drive circuits and a plurality of reflection pixel electrodes, corresponding to pixels, respectively, a protective layer covering the plurality of reflection pixel electrodes and a second alignment layer covering the protective layer; and
    a liquid crystal layer interposed between the first alignment layer on the transparent substrate and the second alignment layer on the drive circuit board,
    wherein,
        the protective layer is a stack of at least first and second dielectric layers different in refractive index from each other,
        the first and second dielectric layers are relatively layered in that order on the plurality of reflection pixel electrodes,
        the liquid crystal display element further comprises a mirror structure in which the refractive index of the second dielectric layer is greater than that of the first dielectric layer and also that of the second alignment layer so that the protective layer is effective to reflect light and the second alignment layer is effective as an optical layer, the second alignment layer and the first dielectric layer having the same composition, the first dielectric layer, the second dielectric layer and the second alignment layer being alternately stacked on the plurality of reflection pixel electrodes so as to form the mirror structure,
        a ratio of the thickness of each of the stacked dielectric layers compensates for the wavelength dependence of the reflectance of the reflection pixel electrodes, wherein for a predetermined total thickness of the stacked dielectric layers said ratio of the thickness of each of the stacked dielectric layers is selected from the group consisting of: a one-to-one, a one-to-two, and a two-to-one ratio for the first and second dielectric layers, respectively, such that the reflectance is approximately constant over a waveband of plural wavelengths, and
        the liquid crystal layer has vertically-aligned liquid crystal molecules pretilted by both the first and second alignment layers.

2. The element according to claim 1, wherein the first dielectric layer is a silicon dioxide layer and the second dielectric layer is a silicon nitride layer.

3. The element according to claim 2, wherein:
    the reflection pixel electrodes are formed from an aluminum film or aluminum-based film; and
    the first dielectric layer is a silicon dioxide layer and the second dielectric layer is a silicon nitride layer.

4. The element according to claim 3, wherein the thickness of the second alignment layer is about 50 nm.

5. The element according to claim 1, wherein the vertically-aligned liquid crystal has a negative dielectric anisotropy and liquid crystal molecules pretilted in a predetermined direction for the vertical alignment.

6. The element according to claim 1 wherein the ratio of the thickness of one of the first and second dielectric layers to that of the second alignment layer is in the range of about 1 to about 2.

7. The element according to claim 1 wherein the first and second alignment layers are formed from obliquely-evaporated silicon dioxide layers.

8. A liquid crystal display device which uses light modulated by a liquid crystal display element to display an image, the liquid crystal display element comprising:
    a transparent substrate having formed on a surface thereof a transparent electrode and a first alignment layer covering the transparent electrode;

a drive circuit board disposed in opposition to the transparent substrate and having formed on a surface thereof facing the transparent electrode a plurality of drive circuits and a plurality of reflection pixel electrodes, corresponding to pixels, respectively, a protective layer covering the plurality of reflection pixel electrodes and a second alignment layer covering the protective layer; and a liquid crystal layer interposed between the first alignment layer on the transparent substrate and the second alignment layer on the drive circuit board, wherein, the protective layer is a stack of at least first and second dielectric layers different in refractive index from each other, the first and second dielectric layers are relatively layered in that order on the plurality of reflection pixel electrodes, the liquid crystal display element further comprises a mirror structure in which the refractive index of the second dielectric layer is greater than that of the first dielectric layer and also that of the second alignment layer so that the protective layer is effective to reflect light and the second alignment layer is effective as an optical layer, the second alignment layer and the first dielectric layer having the same composition, the first dielectric layer, the second dielectric layer and the second alignment layer being alternately stacked on the plurality of reflection pixel electrodes so as to form the mirror structure, a ratio of the thickness of each of the stacked dielectric layers compensates for the wavelength dependence of the reflectance of the reflection pixel electrodes, wherein for a predetermined total thickness of the stacked dielectric layers said ratio of the thickness of each of the stacked dielectric layers is selected from the group consisting of: a one-to-one, a one-to-two, and a two-to-one ratio for the first and second dielectric layers, respectively, such that the reflectance is approximately constant over a waveband of plural wavelengths, and the liquid crystal layer has vertically-aligned liquid crystal molecules pretilted by both the first and second alignment layers.

9. The device according to claim 8, wherein the first dielectric layer is a silicon dioxide layer and the second dielectric layer is a silicon nitride layer.

10. The device according to claim 9, wherein:

the reflection pixel electrodes are formed from an aluminum film or aluminum-based film; and the first dielectric layer is a silicon dioxide layer and the second dielectric layer is a silicon nitride layer.

11. The device according to claim 10, wherein the thickness of the second alignment layer is about 50 nm.

12. The device according to claim 8, wherein the vertically-aligned liquid crystal has a negative dielectric anisotropy and liquid crystal molecules pretilted in a predetermined direction for the vertical alignment.

13. The device according to claim 8, further including a light source and a projecting means for projecting light emitted from the light source and modulated by the liquid crystal display element onto a screen, to thereby form a liquid crystal projector.

14. The device according to claim 13, wherein the light source is a high-pressure mercury lamp.

15. The device according to claim 13, wherein the protective layer and the second alignment layer form optical stacked layers effective to generate multi-reflected rays.

16. The element according to claim 1, wherein the protective layer and the second alignment layer form optical stacked layers effective to generate multi-reflected rays.

17. The device according to claim 8 wherein the ratio of the thickness of one of the first and second dielectric layers to that of the second alignment layer is in the range of about 1 to about 2.

18. The device according to claim 8 wherein the first and second alignment layers are formed from obliquely-evaporated silicon dioxide layers.

* * * * *